United States Patent [19]

Raufast

[11] Patent Number: 4,828,145

[45] Date of Patent: May 9, 1989

[54] PRESSURE LOCKED ROTARY TRAP CHAMBER

[75] Inventor: Charles Raufast, Saint Julien les Martigues, France

[73] Assignee: BP Chemicals Limited, London, England

[21] Appl. No.: 204,911

[22] Filed: Jun. 8, 1988

Related U.S. Application Data

[63] Continuation of Ser. No. 902,433, Aug. 29, 1986, abandoned.

[30] Foreign Application Priority Data

Sep. 11, 1985 [FR] France ............................... 85 13569

[51] Int. Cl.⁴ ............................................. G01F 11/10
[52] U.S. Cl. ....................................... 222/1; 222/217; 222/197; 222/367; 222/370
[58] Field of Search ......................................... 222/370

[56] References Cited

U.S. PATENT DOCUMENTS

| | | | |
|---|---|---|---|
| 3,077,272 | 2/1963 | Reinhall | 222/342 X |
| 3,353,723 | 11/1967 | Wieleba | 222/368 |
| 3,446,404 | 5/1969 | Mehta | 222/368 X |
| 4,058,240 | 11/1977 | Becker | 222/368 |
| 4,176,767 | 12/1979 | Franche, IV | 222/243 |
| 4,316,559 | 2/1982 | McLemore | 222/342 X |
| 4,687,381 | 8/1987 | Dumain et al. | 222/61 X |

FOREIGN PATENT DOCUMENTS

| | | |
|---|---|---|
| 25137 | 3/1981 | European Pat. Off. . |
| 2527412 | 1/1977 | Fed. Rep. of Germany ........ 406/68 |
| 2711180 | 9/1978 | Fed. Rep. of Germany ...... 222/368 |
| 3145781 | 5/1983 | Fed. Rep. of Germany . |

*Primary Examiner*—Kevin P. Shaver
*Assistant Examiner*—Gregory L. Huson
*Attorney, Agent, or Firm*—Brooks Haidt Haffne & Delahunty

[57] ABSTRACT

The present invention relates to a rotary-type metering device making it possible to dispense granular substances consisting of fine particles which are difficult to handle. The metering device consists of a spherical core rotating around a horizontal axis inside a casing comprising a feed orifice and an outlet orifice. The spherical core comprises at least one cavity having an opening at the surface of the core, and sides and bottom within the core. This cavity has the shape of a volume consisting of two volumes of revolution, contiguous and coaxial, $V_1$ and $V_2$, with an axis perpendicular to the axis of rotation of the spherical core. The volume $V_1$ is a truncated cone of revolution or a cylinder of revolution.

8 Claims, 4 Drawing Sheets

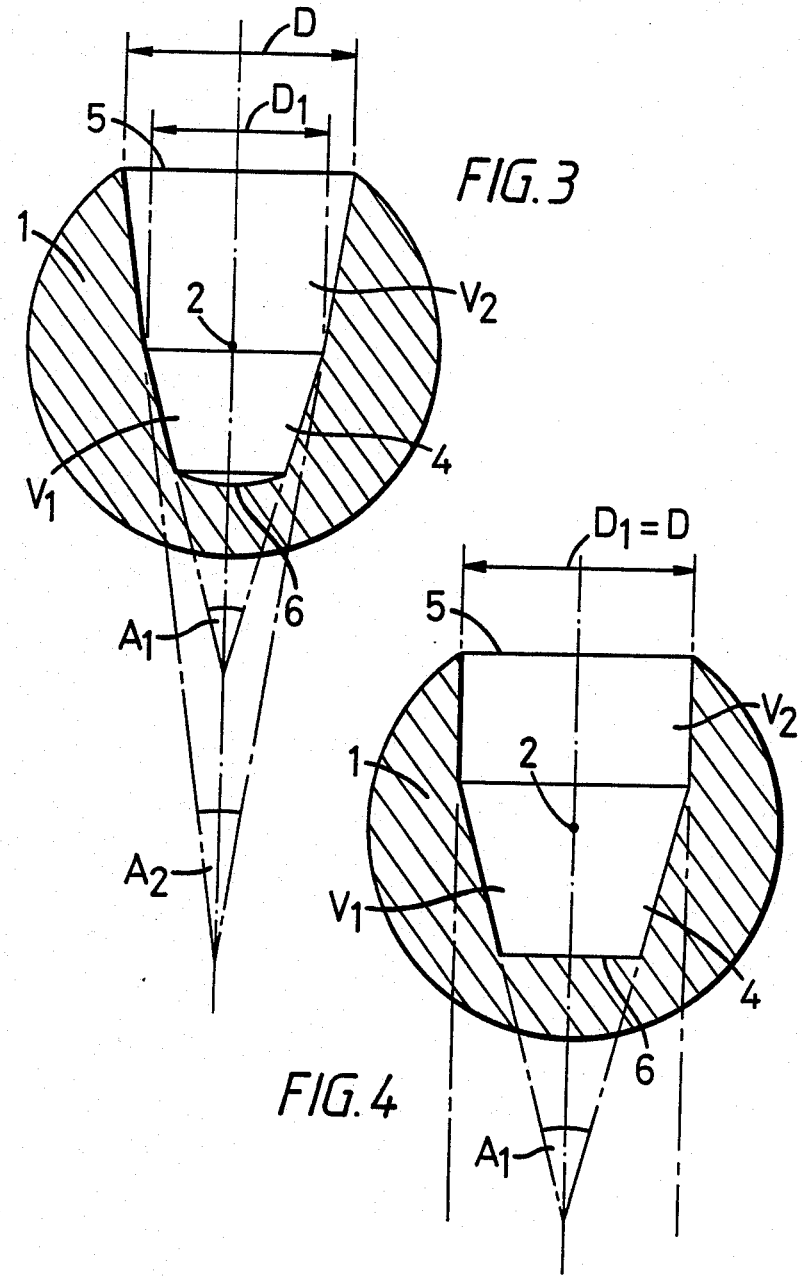

PRESSURE LOCKED ROTARY TRAP CHAMBER

This application is a continuation, of application Ser. No. 06/902,433, filed Aug. 29, 1986 and now abandoned.

The present invention relates to a rotary-type metering device making it possible to dispense reliably determined quantities of a granular substance. This device is particularly applicable to the introduction of a granular substance with catalytic activity into an alpha-olefin polymerisation reactor wherein the polymerisation is performed under relatively low pressure, and more especially into a gas-phase alpha-olefin polymerisation reactor operated, for example under fluidised bed conditions.

One difficulty encountered in processes of low-pressure alpha-olefin polymerisation resides in obtaining reliable and regular introduction of determined quantities of granular substance with catalytic activity into a polymerisation reactor. The granular substance with catalytic activity is generally introduced into continuous polymerisation processes in a sequenced manner. When the quantity of granular substance introduced into the reactor varies considerably from one introduction to the next, it is found that the quality of polymers produced is irregular and that the concentration of the granular substance with catalytic activity in the polymerisation medium becomes so irregular that zones where the speed of reaction is excessive may be produced and bring about the formation of "hot spots", and on occasions, of agglomerates of molten polymer, liable to lead to the stoppage of polymerisation.

This difficulty usually originates from the nature of the granular substance to be introduced. This granular substance may be difficult to handle or may flow with difficulty, especially when it consists of fine particles having a mean diameter by mass, for example, comprised between 10 and 500 microns. This is the case, in particular, with granular substances with catalytic activity employed in low-pressure alpha-olefin polymerisation processes consisting of catalyst systems of the Ziegler-Natta type, or of catalysts based on chromium oxide compounds, or again of prepolymers containing these catalyst systems or these catalysts. Furthermore, when these granular substances with catalytic activity are subjected to physical stresses, such as pressure, on introduction into a polymerisation reactor, the cohesive forces of these granular substances, and also the forces of adhesion to the walls of the chamber where they are located, increase considerably, thus making them difficult to manipulate. In addition, these difficulties may be amplified by electrostatic phenomena when the granular substance consists of prepolymer.

A further difficulty also arises from the fact that usually the granular substance is introduced into a pipe or chamber where a pressure greater than atmospheric pressure prevails, for example comprised between 0.5 and 5 MPa. Because of this the metering device employed to dispense the granular substance must provide satisfactory gas-tightness at all times, in order to avoid losing large quantities of gas or causing a premature reaction inside the metering device which thus runs the risk of becoming blocked.

The use of a rotary-type metering device consisting of a cock valve rotating around an axis inside a casing is already known; this cock is provided with an internal cavity with two openings, which cavity is alternately filled with granular substance, for example from a storage chamber, and emptied of this granular substance under the pressure of a carrier gas which entrains the granular substance into the pipe towards the desired chamber. However, this device has the drawback of permitting large quantities of carrier gas to pass through the chamber, owing to the double opening in the cavity.

A rotary-type metering device has also been proposed which consists of a valve with a cylindrical or conical cock rotating around a horizontal axis inside a casing; this conical cock is provided with at least one recessed cavity which, while it rotates, may be alternately placed in communication with the inlet orifice and outlet orifice of this valve. This recessed cavity generally has the shape of a cylinder of revolution or of a truncated cone the bottom of which may be more or less spherical. However, for mechanical reasons, this metering device cannot usually dispense large quantities of granular substance. Furthermore, a valve with cylindrical or conical cock is not suitable for providing satisfactory gas-tightness, when the granular substance employed is subjected to relatively high pressures. It has also been observed that the granular substance to be dispensed tends to pass into the clearance between the casing of the device and the cylindrical or conical cock thus causing erosion of the moving parts of the device and reducing the gas-tightness. The granular substance passing into the said clearance may also cause the blockage or seizure of the device. Metering devices with a conical cock have been found particularly unsatisfactory owing to the fact that the cock is generally pressed horizontally into the casing of the device to increase the gas-tightness. However, this horizontal pressure increases the erosion of the moving parts and aggravates the problems of blockage, seizure and gas-tightness.

A rotary-type metering device is also known consisting of a spherical cock valve rotating around a horizontal axis and having a recessed cavity of cylindrical form, oriented perpendicularly to this horizontal axis; in this cavity there slides a moving object having a diameter close to that of the recessed cavity such as a piston or a ball which, depending on the position of the cavity, makes it possible alternately to allow a given quantity of granular substance to penetrate into this cavity and to discharge it from the latter. Experience has shown that when this device operates in an industrial plant repeatedly and at a high rate, the moving object sliding inside the recessed cavity frequently becomes blocked because of fine particles present in the granular substance, which prevents the metering device from operating satisfactorily.

A rotary-type metering device has now been found which is capable of solving the difficulties referred to above. In particular, the present invention relates to a device which, on the one hand, provides satisfactory gas-tightness and on the other hand reliably dispenses, without the risk of blockage, a determined quantity of granular substance, consisting of fine particles, into a pipe or chamber liable to be under a relatively high pressure. This metering device in particular makes it possible to handle granular substances which flow with difficulty and which are liable to settle comparatively easily under a low pressure and to form aggregates due to forces of cohesion existing between the particles.

The metering device according to the invention is suitable in particular for granular substances which cannot flow through a hopper according to the ASTM-D-1895-69-77 standardised method.

The present invention provides a rotary type metering device for dispensing determined quantities of a granular substance, comprising a substantially spherical core rotatable on a horizontal axis and housed within a stationary casing, the spherical core having at least one cavity for receiving the granular substance defined by side and bottom surfaces within the spherical core and a circular opening at the surface of the core, the upper part of the casing having an inlet orifice for feeding, and the lower part of the casing having an outlet orifice for discharging the granular substance, the device being characterised in that the or each cavity has a shape defined by two volumes of revolution $V_1$ and $V_2$ having a common axis which is perpendicular to the axis of rotation of the spherical core, the said circular opening having a diameter D equal to the greatest diameter of the cavity, said diameter D being less than or equal to the diameter of the outlet orifice of the casing, the volume $V_1$ defining the lower side and bottom surfaces of the cavity and consisting of at least one truncated cone of revolution having at its virtual apex an angle $A_1$ of between 10° and 90°, such that $10° \leq A_1 \leq 90°$, oriented inwardly in relation to the opening of the cavity, and comprising a small circular base forming the bottom of the cavity and a large circular base of diameter $D_1$, the volume $V_2$ defining the upper side surface and the opening of the cavity consisting of at least one truncated cone of revolution having at its virtual apex an angle $A_2$ of between 0° and $A_1$, such that $0° \leq A_2 < A_1$, also oriented inwardly in relation to the opening of the cavity, and comprising a small circular base of diameter $D_1$ and a large circular base of diameter D corresponding to the opening of the cavity the diameter D and the heights $H_1$ and $H_2$ of the volumes of revolution $V_1$ and $V_2$ respectively being such that: $(H_1+H_2)$ is comprised between 0.1 D and 1.5 D, such that $0.1\ D \leq (H_1+H_2) \leq 1.5\ D$ and with the proviso that the volume of revolution $V_2$ can comprise a cylinder of revolution wherein the diameters $D_1$ and D are equal.

The rotary type metering device may comprise one or more cavities depending on the size of the spherical core of the metering device and the volume of the cavities. The number of cavities also depends on the manner in which the metering device operates, as will be described subsequently. If the spherical core comprises more than one cavity, the cavities must be distanced from each other, in a manner such that at any instant during the rotation of the core, the inlet orifice and the outlet orifice of the casing can each be placed only in communication with a single cavity. In this case, it is preferable that at the moment when one cavity is placed in communication with the inlet orifice, another cavity is in communication with the outlet orifice.

The inlet and outlet orifices for granular substance are preferably located at the top and the bottom respectively of the casing. Preferably they are diametrically opposed in relation to the centre of the spherical core and arranged on an axis vertical and perpendicular to the axis of rotation of the spherical core, so that the filling and emptying of the cavity is provided by the force of gravity exerted on the granular substance. The inlet and outlet orifices in the casing are preferably circular and of equal diameter.

The diameter D of the cavity is less than or preferably equal to the diameter of the outlet orifice of the casing. It has been observed that when the diameter D of the cavity opening is greater than the diameter of the outlet orifice of the casing, the granular substance is more difficult to discharge from the cavity; because of this the quantities of granular substance are no longer dispensed in such a reliable and regular manner by the metering device.

The shape of the cavity is one of the essential features of the metering device which makes it possible, according to the invention, to manipulate granular substances which have inherently poor flow properties. The truncated cone of revolution $V_1$ has an angle $A_1$ such that $10° \leq A_1 \leq 90°$ and preferably such that $10° \leq A_1 \leq 60°$. It has in fact been found that when the angle $A_1$ is less than 10°, the granular substance is difficult to discharge from the cavity. In particular, when the lower side and bottom surfaces of the cavity are composed not of a truncated cone of revolution but by a cylinder of revolution, it is noted that the granular substance can remain partially or even totally blocked inside the cavity. These difficulties are aggravated still further when the virtual apex of $V_1$ is oriented outwardly, (i.e. toward the opening of the cavity) and under these circumstances the granular substance cannot be easily discharged from the cavity and frequently remains partially or even totally blocked inside the cavity. A similar observation has been made when the virtual apex of the truncated cone $V_2$ is oriented in the direction of the opening of the cavity.

The truncated cone of revolution $V_1$ is also characterised by two circular bases. The smaller of these two bases corresponds to the bottom surface of the cavity. This bottom surface preferably consists of a plain surface or a flattened dome.

The diameter D and the heights $H_1$ and $H_2$ of the volumes of revolution $V_1$ and $V_2$ respectively are such that;

$$0.1\ D \leq H_1+H_2 \leq 1.5\ D$$

and preferably such that:

$$0.5\ D \leq H_1+H_2 \leq 1.2\ D$$

Preferably the ratio of the heights $H_2/H_1$ is less than or equal to 2, more preferably less than or equal to 1.5, in order to permit easy discharge of the granular substance from the cavity.

According to one embodiment of the present invention, the volume of revolution forming the cavity of the metering device comprises more than one truncated cone of revolution complying with the definition of the volume $V_1$ and/or more than one truncated cone of revolution complying with the definition of volume $V_2$.

The truncated cones of revolution complying with the definition of the volume of revolution $V_1$ are arranged successively contiguously between the circular bases of diameter comprised between that comprising the bottom of the cavity and $D_1$, the larger base of each of these truncated cones constituting the small base of the truncated cone immediately following in the direction going from the bottom to the opening of the cavity. The value of the angle $A_1$ of the virtual apex of each of these truncated cones of revolution decreases in order of sequence from the bottom towards the opening of the cavity.

In the same way, the truncated cones of revolution complying with the definition of the volume $V_2$ are arranged contiguously between the circular bases of a diameter comprised between the extreme values $D_1$ and D, the larger base of each of these truncated cones constituting the smaller base of the truncated cone next following in the direction going from the bottom towards the opening of the cavity. The value of the angle $A_2$ of the virtual apex of each of these truncated cones of revolution complying with the definition of the volume $V_2$ decreases in order of sequence of the truncated cones of revolution oriented towards the opening of the cavity.

However, in order to produce in a practical manner a cavity of this type in the spherical core of the metering device, it is preferable that the number of truncated cones of revolution complying with the definition of the volumes $V_1$ and $V_2$ respectively should be less than or equal to 3.

In order to reduce the risk of adhesion of the granular substance to the wall of the cavity, it is preferred that the latter should be as smooth as possible.

In order to ensure tightness between the spherical core and the casing in which it rotates, these latter are preferably provided with sealing devices such as gaskets or packings. These sealing devices advantageously comprise annular or preferably toroidal bodies, for example O-rings, arranged in the casing of the device, providing a housing in which the spherical core rotates. Preferably an annular or toroidal seal is located horizontally around the inlet orifice at the upper part of the casing and a similar seal is located around the outlet aperture at the lower part of the casing. With this particular embodiment, it has been observed that the opening of the cavity slides easily in contact with the upper seal, the latter pressing against, and gently compacting the granular substance located in the cavity. Using seals of this type, it is possible to provide substantial clearance between the spherical core and the casing and thereby to reduce problems arising from erosion and seizure of the core. Despite the fact that the granular substance is slightly compressed by the seals, the defined shape of the cavity facilitates good flow of the granular substance during discharge from the outlet orifice. Similar results can be obtained when two annular or toroidal seals are arranged vertically in the solid body, provided that the seals are placed in vertical planes which are substantially parallel to the axis of rotation of the core.

The metering device of the present invention may be used to dispense granular substances consisting of relatively fine particles, for example particles having a mean diameter by mass comprised between 10 and 500 microns, preferably comprised between 50 and 300 microns. These granular substances may consist of substances with a catalytic activity, for example alpha-olefin polymerisation catalysts of the Ziegler-Natta type based for example on a titanium compound, or catalysts based on chromium oxide compounds, or supported catalytic systems in which the support may in particular consist of silica, alumna or a magnesium compound, such as magnesium chloride. The granular substances employed in the metering device of the present invention may also consist of a prepolymer of alpha-olefins.

The granular substances employed in the metering device can contain liquid compounds which increase the faculty of aggregation of the particles to each other, it being possible for the content by weight of these liquid compounds to be comprised for example between and 0.1 and 10%. It is possible to employ using the metering device granular substances comprising catalysts or catalytic systems and a liquid compound such as an organometallic compound, for example an organoaluminium compound.

The metering device is suitable for dispensing in a reliable manner granular substances which may have a bulk density at rest which is particularly low, comprised for example between 0.20 and 0.60 g/cm$^3$ and preferably comprised between 0.25 and 0.40 g/cm$^3$. The metering device is particularly useful for feeding large-capacity industrial reactors with granular substance. In this way, it is possible to dispense reliably quantities of granular substance which may amount for example for each introduction to 3000 g and generally quantities comprised between 500 and 2000 g. The operation making it possible to introduce into the industrial reactor a determined quantity of granular substance may be repeated at a frequency which may amount to up to 6 times per minute, and is generally comprised between 1 and 3 times per minute. In particular this metering device is suitable for feed rates of granular substance generally comprised between 30 and 1000 kg per hour.

The metering device of the present invention is particularly advantageous for dispensing reliably, regularly and for long periods of time comparatively large quantities of granular substance which are difficult to handle, into a pipe or a chamber liable to be under a high pressure, at the same time providing satisfactory freedom from leakage of gas present in the pipe or the chamber.

The metering device of the present invention and its mode of operation are described in more detail below, with respect to the accompanying drawings, in which FIG. 1 represents a simplified diagram of the rotary-type metering device, consisting of a casing in which a spherical core rotates;

FIGS. 2, 3, and 4 represent various forms of embodiment of the cavity comprised in the spherical core;

FIGS. 5 and 6 represent improvements to the rotary-type metering device.

FIG. 1 is a simplified diagram of the rotary-type metering device, which shows; at (1) a spherical core rotating around a horizontal axis (2) inside a casing (3), at (4) a cavity consisting of the contiguous volumes of two truncated cones of revolution $V_1$ and $V_2$, at (5) the opening of the cavity, at (6) the bottom of the cavity, at (7) the inlet orifice for granular substance, located at the top of the casing (3)

at (8) the outlet orifice located at the bottom of the casing (3) and at (9) and (10) the seals providing gas-tightness between the top and the bottom of the casing (3).

FIG. 2 shows in diagram form the spherical core (1) of FIG. 1, comprising a cavity (4) consisting of the contiguous volumes of two truncated cones of revolution $V_1$ and $V_2$ in which the angle $A_2$ is less than the angle $A_1$. The truncated cone of revolution $V_2$ comprises a large circular base of diameter D defining the opening (5) of the cavity, a small circular base of diameter $D_1$ defining the boundary (17) between $V_1$ and $V_2$, and a truncated conical surface (15) defining the upper side surface of cavity (4). The truncated cone of revolution $V_1$ comprises a large circular base of diameter $D_1$ corresponding to boundary (17), a small circular base corresponding to the planar surface (6) forming the bottom of the cavity, and a truncated conical surface (16) defining the lower side surface of the cavity (4).

FIG. 3 is a simplified diagram of a spherical core (1) comprising a cavity (4) identical to that of FIG. 2, except for the fact that the bottom (6) of the cavity consists of a flattened dome.

FIG. 4 is a simplified diagram of a spherical core (1) comprising a cavity (4) consisting of the contiguous volumes $V_1$ and $V_2$, the volume $V_2$ consisting of a cylinder of revolution.

Figure 1:
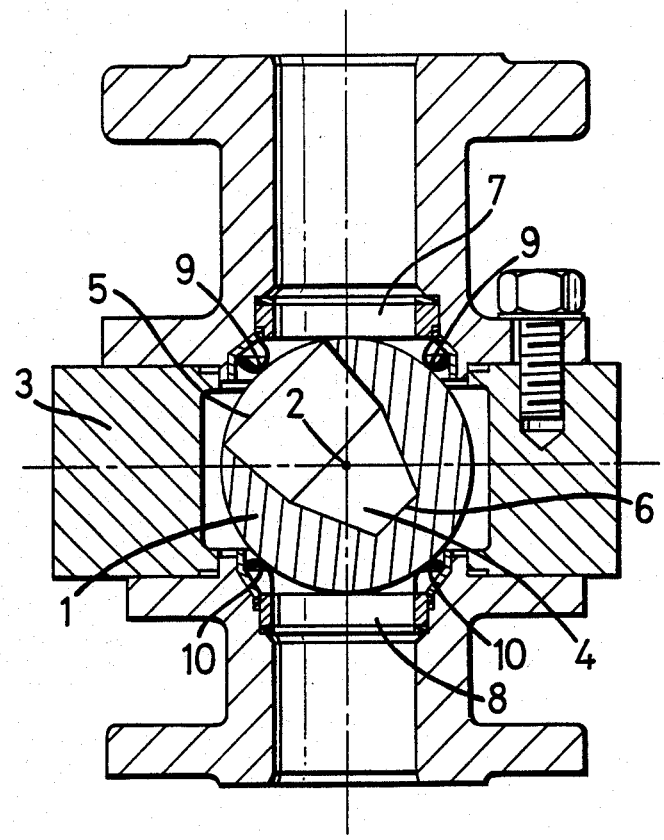
Figure 2:
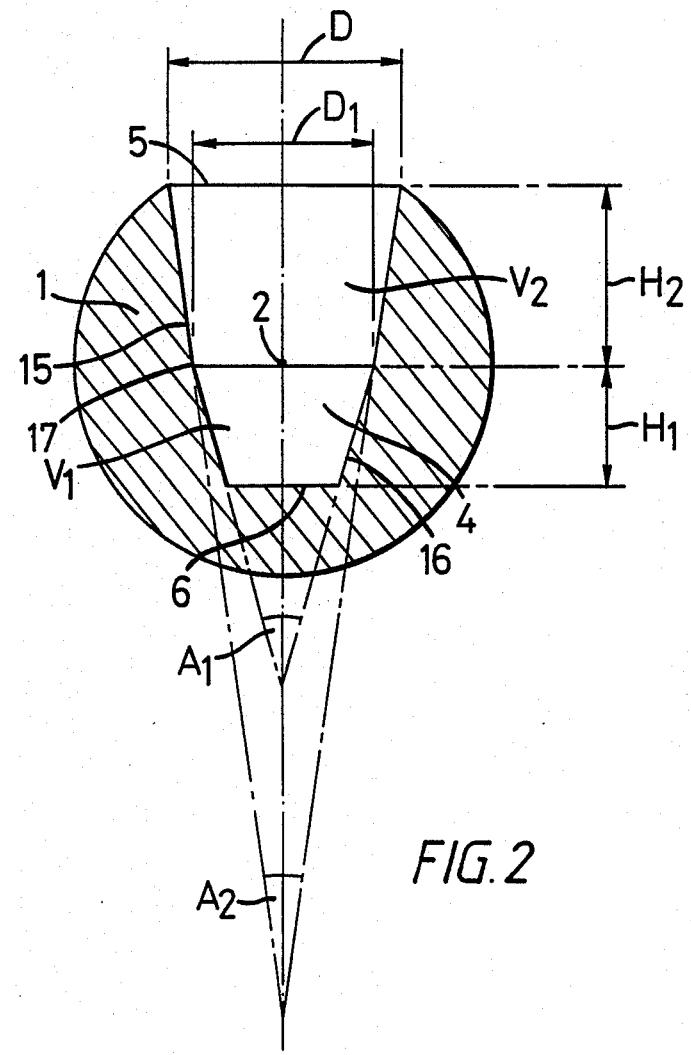

The present invention likewise relates to a process for employing the rotary-type metering device described below, based on FIG. 1. At the commencement of each operation for dispensing a determined quantity of granular substance, the opening (5) of the cavity is placed opposite the inlet orifice (7) from a feed hopper (not shown) located above the inlet orifice. The cavity (4) then fills with granular substance. The spherical core (1) turns around its axis of rotation (2), so as to place the opening (5) of the cavity opposite the outlet orifice (8). The granular substance contained in the cavity (4) then empties into the outlet orifice (8). The operation may then be repeated, either at a fixed frequency determined in advance, or in a manner modulated according to requirements. The rotation of the spherical core (1) can be performed continuously at a more or less constant speed, sufficiently slowly to enable each cavity (4) to be completely filled and emptied successively. The rotation may also be effected in a continuous manner but at a variable speed, this speed being lower when the opening (5) of each cavity is in communication with the inlet orifice (7) or with the outlet orifice (8), so as to facilitate the filling and emptying of the cavity (4). The rotation of the spherical core (1) can also be performed discontinuously, so that the spherical core (1) pauses for a suitable length of time when each cavity is in the filling and emptying position. In certain cases, the cohesive forces of the particles of the granular substance and the forces of adhesion of these particles to the wall of the cavity (4) are added together and attain a value such that the granular substance can no longer easily flow away from the cavity (4), when the opening (5) of the cavity is facing the outlet orifice (8).

This effect may in certain cases prevent the granular substance contained in the cavity (4) from pouring into the outlet orifice (8), either wholly or partially, and by this fact render the operation of the metering device erratic. These difficulties may be increased when the rotary movement of the spherical cock is slow and continuous.

Figure 5:
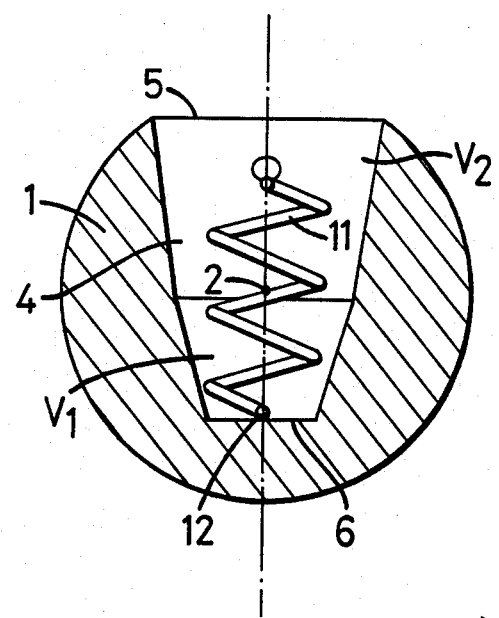
FIG. 5 is a simplified diagram of a spherical core (1) comprising a cavity (4) consisting of the contiguous volumes $V_1$ and $V_2$; the cavity (4) contains a helical spring (11) fixed at (12) to the bottom (6) of the cavity (4).
Figure 6:
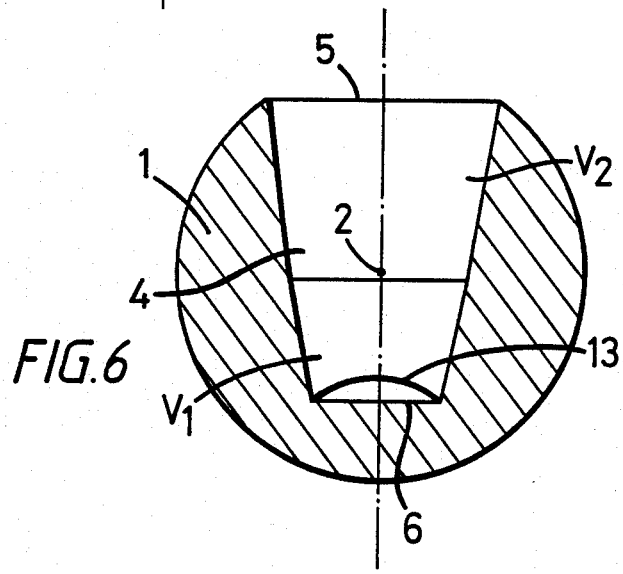
FIG. 6 is a simplified diagram of a spherical core (1) comprising a cavity (4) consisting of the contiguous volumes $V_1$ and $V_2$; the cavity (4) contains a curved elastic membrane (13), fixed to the bottom (6) of the cavity (4).

Improvements such as represented on FIGS. 5 and 6 are useful for solving the above mentioned difficulties.

An improvement aimed at facilitating the emptying of the granular substance out of the metering device consists in fixing in the cavity (4) an elastic member, which is capable of restoring the energy of compression to which the contents of the cavity (4) are subjected during the rotation of the spherical core (1). In the mode of embodiment of this improvement shown in FIG. 5, a helical spring (11), ballasted at its free end, is fixed on the bottom (6) of the cavity (4). When the opening (5) of the cavity is oriented upwards and placed in communication with the feed orifice (7) the helical spring (11) the upper part of which is below the opening (5) is compressed under the effect of its own weigh, the weight of the granular substance which penetrates into the cavity (4) and of the. static pressure engendered by the granular substance present in the hopper, not shown in FIG. 1, which surmounts the metering device. When the opening (5) of the cavity is then oriented downwards and placed in communication with the outlet orifice (8), the helical spring (11) springs back and causes a shearing force which breaks the force of adhesion between the wall of the cavity (4) and the granular substance, which facilitates the discharge of the latter out of the cavity (4).

In another mode of embodiment of this improvement shown in FIG. 6, a curved membrane (13) in an elastic material, such as a thin metallic foil, is fixed in the bottom (6) of the cavity (4). Under the effect of the pressure of the granular substance, this membrane is deformed towards the bottom (6) of the cavity (4) during the filling of the cavity (4). When the opening (5) of the cavity is in communication with the outlet orifice (8), the metallic foil resumes its initial shape, which facilitates the discharge of the granular substance present in the cavity (4). The shape and elastic properties of the membrane are chosen so that the membrane can be sufficiently deformed to obtain the effect sought.

The spherical core of the metering device is designed so as not to permit a direct passage between the feed orifice and the outlet orifice at any instant in the rotation of the spherical core. It is therefore possible to operate the metering device with substantial pressure differences, for example, 5 MPa, between the inlet orifice and the outlet orifice.

I claim:

1. A rotary type metering device for dispensing determined quantities of a granular substance consisting of fine and catalytically active particles into an alpha-olefin polymerization reactor, comprising a substantially spherical core rotatable on a horizontal axis and housed within a stationary casing, the spherical core having at least one cavity for receiving the granular substance defined by side and bottom surfaces within the spherical core and a circular opening at the surface of the core, the upper part of the casing having an inlet orifice for feeding, and the lower part of the casing having an outlet orifice for discharging the granular substance, annular or toroidal seals being arranged between the casing and the spherical core, the device characterized in that the cavity has a shape defined by two volumes of revolution $V_1$ and $V_2$ having a common axis which is perpendicular to the axis of rotation of the spherical core, the said circular opening having a diameter D equal to the greatest diameter of the cavity, said diameter D being less than or equal to the diameter of the outlet orifice of the casing, the volume $V_1$ defining the lower side and bottom surfaces of the cavity and consisting of at least one truncated cone of revolution having at its virtual apex an angle $A_1$ of between $10° \leq A_1 \leq 90°$, oriented inwardly in relation to the opening of the cavity, and comprising a small circular base forming the bottom of the cavity and consisting of a plain surface or a flattened dome and a large circular base of diameter $D_1$, the volume $V_2$ defining the upper side surface and the opening of the cavity consisting of at least one truncated cone of revolution having at its virtual apex and angle $A_2$ of between 0° and $A_1$, such that $0° \leq A_2 < A_1$, also oriented inwardly in relation to the opening of the cavity, and comprising a small circular base of diameter $D_1$ and a large circular base of diameter D corresponding to the opening of the cavity the diameter D and the heights $H_1$ and $H_2$ of the volumes of revolution $V_1$ and $V_2$ respectively being such that: the ratio of the heights $H_2/H_1$ is less than or equal to 2 but greater than zero and $(H_1+H_2)$ is comprised between 0.1 D and 1.5 D, such that $0.1 \leq (H_1+H_2) \leq 1.5$ D and wherein the volume of revolution $V_2$ is a cylinder of revolution when the diameters $D_1$ and D are equal.

2. Device according to claim 1, characterised in that the inlet and outlet orifices of the casing are diametrically opposed in relation to the centre of the spherical core.

3. Device according to claim 1, characterised in that the inlet and outlet orifices of the casing are arranged on a vertical axis which is perpendicular to the axis of rotation of the spherical core.

4. Device according to claim 1, characterised in that the inlet outlet orifices of the casing are circular and of equal diameter.

5. Device according to claim 1 wherein the seals are arranged in horizontal planes around the inlet and outlet orifices or in vertical planes parallel to the axis of rotation of the spherical core.

6. Process to dispense a given quantity of granular substance, employing the metering device according to claim 1.

7. Process according to claim 6 characterised in causing the spherical core to rotate continuously at a constant speed, which is sufficiently slow to enable the cavity successively to fill and empty completely.

8. Process according to claim 6 characterised in causing the spherical core to rotate discontinuously so that the spherical core pauses when each cavity is in a filling and emptying position.

* * * * *